United States Patent [19]
Hubred

[11] Patent Number: 5,580,463
[45] Date of Patent: Dec. 3, 1996

[54] PRESSURIZED, SPARGED FLOTATION COLUMN

[75] Inventor: Gale L. Hubred, Brea, Calif.

[73] Assignee: Chevron U.S.A. Inc., Richmond, Calif.

[21] Appl. No.: 329,958

[22] Filed: Oct. 27, 1994

[51] Int. Cl.$^6$ .............................. C02F 1/24; B01D 17/035
[52] U.S. Cl. ........................ 210/703; 210/708; 210/709; 210/741; 210/221.2
[58] Field of Search ........................... 210/703, 704, 210/705, 706, 707, 741, 808, 712, 708, 709, 221.2

[56] References Cited

U.S. PATENT DOCUMENTS

| | | |
|---|---|---|
| 2,047,989 | 7/1936 | Woelflin . |
| 2,730,190 | 1/1956 | Brown . |
| 3,479,281 | 11/1969 | Kikindai . |
| 3,884,803 | 5/1975 | Traylor . |
| 4,198,300 | 4/1980 | Williams ................................. 210/170 |
| 4,627,922 | 12/1986 | Viator et al. ............................ 210/704 |
| 4,752,399 | 6/1988 | Viator et al. ............................ 210/704 |
| 5,122,261 | 6/1992 | Hollingsworth ........................ 209/170 |
| 5,180,503 | 1/1993 | Gorelick et al. ......................... 210/758 |
| 5,294,003 | 3/1994 | Hollingsworth ........................ 209/164 |

FOREIGN PATENT DOCUMENTS 55-16686  5/1980  Japan .

OTHER PUBLICATIONS

J. A. Finch, G. S. Dobby; Column Flotation; *Pergamon Press;* pp. 1–3, 5–6, 27–33, 116, 117, 151, 162–165.

"Flotation of Oil Droplets from Water", Engineering Foundation Conference; Franklin Pierce College, New Hampshire Aug. 2–7, 1981, located in Interfacial phenomena in mineral processing pp. 287–301.

*Primary Examiner*—Thomas M. Lithgow
*Attorney, Agent, or Firm*—W. Keith Turner

[57] ABSTRACT

A method for removing residual oil from oily water under pressure is provided. The method comprises flowing a liquid stream of an oily water downward through a vertically extended zone to remove the residual oil. A gas is injected into the lower end of the zone and at a rate sufficient to generate bubbles of a predetermined volume in the liquid stream. A sufficient pressure is maintained in the zone to control the rate of expansion of the bubbles to a volume compatible with oil droplets in the liquid stream during upward migration of the bubbles and the oil droplets. The rate of flow of the liquid stream from the lower end of the zone and the rate of flow of the gas from the upper end of the zone are regulated to collect residual oil from a quiescent volume within the upper portion of the zone.

18 Claims, 3 Drawing Sheets

PRESSURIZED, SPARGED FLOTATION COLUMN

BACKGROUND OF THE INVENTION

Water produced from crude oil and natural gas production usually contains varying residual concentrations of crude oil, natural gas condensates and solids. Water and oil mixtures also result from the water washing of refined petroleum fractions following generally known refining processes, as well as from drainage from the various equipment used in such processes. These contaminants must be removed before the water suspension component can be either used in secondary recovery operations or safely discarded.

The small particles of oil are suspended in the water and held there by mechanical, chemical and electrical forces. The amount of oil contained in the untreated produced water in most systems will vary from about 5 parts per million to about 2,000 parts per million. In some systems, oil contents as high as 20,000 parts per million (2%) have been observed.

The oil droplets in untreated produced water will usually vary in size from 1 to about 1,000 micrometers with most of the oil droplets ranging between 10 and 100 micrometers in diameter. Various methods have been suggested for use in removing oil from produced water, based upon one or more of the following principles: gravity separation of lighter oil droplets from the water; coalescence of the smaller oil droplets; or gas flotation of the oil droplets. The degree of oil removal that is obtained by gravity separation alone typically is inadequate to obtain the necessary oil removal and secondary treatment (such as gas flotation) is required.

Of the above-described principles, gas flotation is the only one which does not rely on gravity separation of the droplets, the gas flotation action in fact being independent of oil droplet size. In gas flotation units, large quantities of gas bubbles are introduced into a flotation chamber. These bubbles float the oil droplets and solids suspended in the oily water to the water's surface, thereby producing an effluent water of substantially reduced oil content.

Two distinct types of flotation units are commonly used, which are distinguished by the method employed in producing the gas bubbles needed to contact the water. These are the dissolved-gas units and dispersed-gas units. U.S. Pat. No. 3,884,803 issued to Traylor describes both types of flotation units. Dissolved-gas units take a portion of the partially treated water effluent and saturate the water effluent with a manufactured gas, such as natural gas or air, by elevating the pressure in a contactor so that the gas is dissolved in the water. The higher the pressure the partially treated water is subjected to, the more gas can be dissolved in the water. Generally, dissolved gas units utilize a contactor pressure of about 20 to 40 psi, with about 20% to 50% of the partially treated water recirculated for contact with the gas. The gas-saturated water is then introduced into a flotation chamber maintained at atmospheric pressure or at a pressure lower than the contactor pressure where the gas breaks out of the solution (i.e., effervesces) so that small diameter bubbles float the oil and solid droplets to the surface where they are mechanically separated.

In the dispersed-gas units, gas bubbles are mechanically dispersed in the oily water either through the use of an inductor device or by a vortex set up by mechanical rotors. Most dispersed-gas units contain three or four cells, where oily water flows in series from one cell to another cell by under flow baffles. In each cell, a portion of the oil and solid droplets are floated to the top for mechanical separation from the treated water.

There are several disadvantages inherent in both the dissolved-gas and dispersed-gas flotation systems. The first is that both systems rely on a recycling of the produced gas, which leads to the gas eventually coming to equilibrium with the water, making it unavailable for use in volatile hydrocarbon stripping. In the dispersed-gas system there is the additional problem associated with the use of high shear pumps or mixers which tend to shear oil droplets. Mixers or pumps also create a mixed cell which prevents having a "quiet" zone for the separation of the oil and water.

Another type of flotation unit is shown in U.S. Pat. Nos. 4,627,922 and 4,752,399 both issued to Viator et al. The unit in Viator et al. first disperses a combination of two gases in an oily water stream at line pressure with turbulent gas dispersion techniques. Then the gas-containing oily water is tangentially injected into a flotation chamber where gas bubbles laden with oil float to the surface of the flotation chamber. The first gas is used to attract the oil droplets but because the bubbles created are very small, a second more buoyant gas is added to impart greater buoyancy to the bubbles to promote movement of the bubbles containing the oil to the surface of the flotation chamber. When the gas-containing water is tangentially injected into the flotation chamber only a portion of the oil contamination has been removed from the water therefore a second combination of two gases is injected at the bottom of the flotation chamber. The second combination of bubbles float upward against the downward swirling water under turbulent conditions to create multistages of contact between the bubbles and water to remove the remaining dissolved oil from the water. The oily water at the bottom of the flotation tank is forced by hydrostatic head through a conduit up to the top of the flotation chamber where it is removed. The two gases are collected, cleaned and recycled for use again in the system.

U.S. Pat. No. 4,198,300 issued to Williams discloses a method and apparatus for removing suspended oil from an oily waste water stream produced from an offshore well. The oily water is injected into a submerged vertical pipe near the upper middle portion of the pipe. Gas produced from the well is injected into the lower end of the pipe and forms bubbles that rise through the pipe countercurrently contacting the suspended oil in the oily water, thereby promoting the separation of the droplets from the oily water. The pipe is unpressurized so that as the bubbles rise through the pipe they are subjected to a reduced hydrostatic pressure which causes the bubbles to grow in size. The growth of the bubbles reduces their effectiveness in removing the small oil droplets from the oily water.

In view of the limitations of the known devices, it is an object of the present invention to provide a means for treating produced oily water which does not rely on high shear pumps or gas saturated water to produce gas bubbles. It is a further object to use a pressurized system so that the size of the gas bubbles can be controlled. It is a still further object of this invention to develop a system for generating larger overall diameter gas bubbles (e.g., 500 micrometers) relative to the size of the oil droplets (e.g., 10 micrometers) and in which the produced gas is not recycled through the system. It is an advantage of the present invention that the gas induced into the system is preferably used only once, and then recovered for alternative use because the gas does not reach equilibrium with the water. The gas can be captured and reused in the present invention.

SUMMARY OF THE INVENTION

Briefly, the present invention comprises an improved gas flotation method for removing residual oil droplets from produced water through the use of a gas that is miscible with oil, such as field available natural gas generated from generally known oil production operations or air. The invention utilizes a pressurized flotation column (above approximately 100 psi) having an oily water feed inlet positioned above a gas inlet, as well as a floated oil outlet at the top of the column and a clean water outlet at the bottom of the column. Field available natural gas, a normal byproduct of the production operation, can be captured from the field and temporarily diverted to the flotation column through a porous medium located in the interior of the column and having openings of a predetermined size. As the diverted natural gas passes through the porous medium gas bubbles having a predetermined diameter (generally, about 500 micrometers) are produced. The flotation column is pressurized so that the predetermined diameter of the gas bubbles can be controlled as they rise to the top of the flotation column.

The bubbles, having a larger overall diameter as compared to the suspended oil droplets, and therefore a faster rise rate, quickly migrate through the oily water. The suspended oil droplets attach themselves to the bubbles and rise to the top of the column where the floated oil is drawn off. The temporarily diverted natural gas used to generate the gas bubbles for the clarification process is then recaptured at the top of the column and returned for general commercial processing or for reuse in the column.

In one of its method aspects, there is provided a method for removing residual oil from oily water which comprises flowing a liquid stream of an oily water downward through a vertically extended zone to remove the residual oil; injecting a gas into the lower end of said zone and at a rate sufficient to generate bubbles of a predetermined volume in said liquid stream; maintaining a pressure in said zone sufficient to control the rate of expansion of said bubbles to a volume compatible with oil droplets in said liquid stream during upward migration of said bubbles and said oil droplets; regulating the rate of flow of said liquid stream from the lower end of said zone and regulating the rate of flow of said gas from the upper end of said zone to collect residual oil from a quiescent volume within the upper portion of said zone; and removing the liquid stream from said lower end of said vertically extended zone.

BRIEF DESCRIPTION OF THE DRAWING

The invention will now be described with reference to the accompanying drawing, in which.

DETAILED DESCRIPTION OF THE INVENTION

Figure 1:
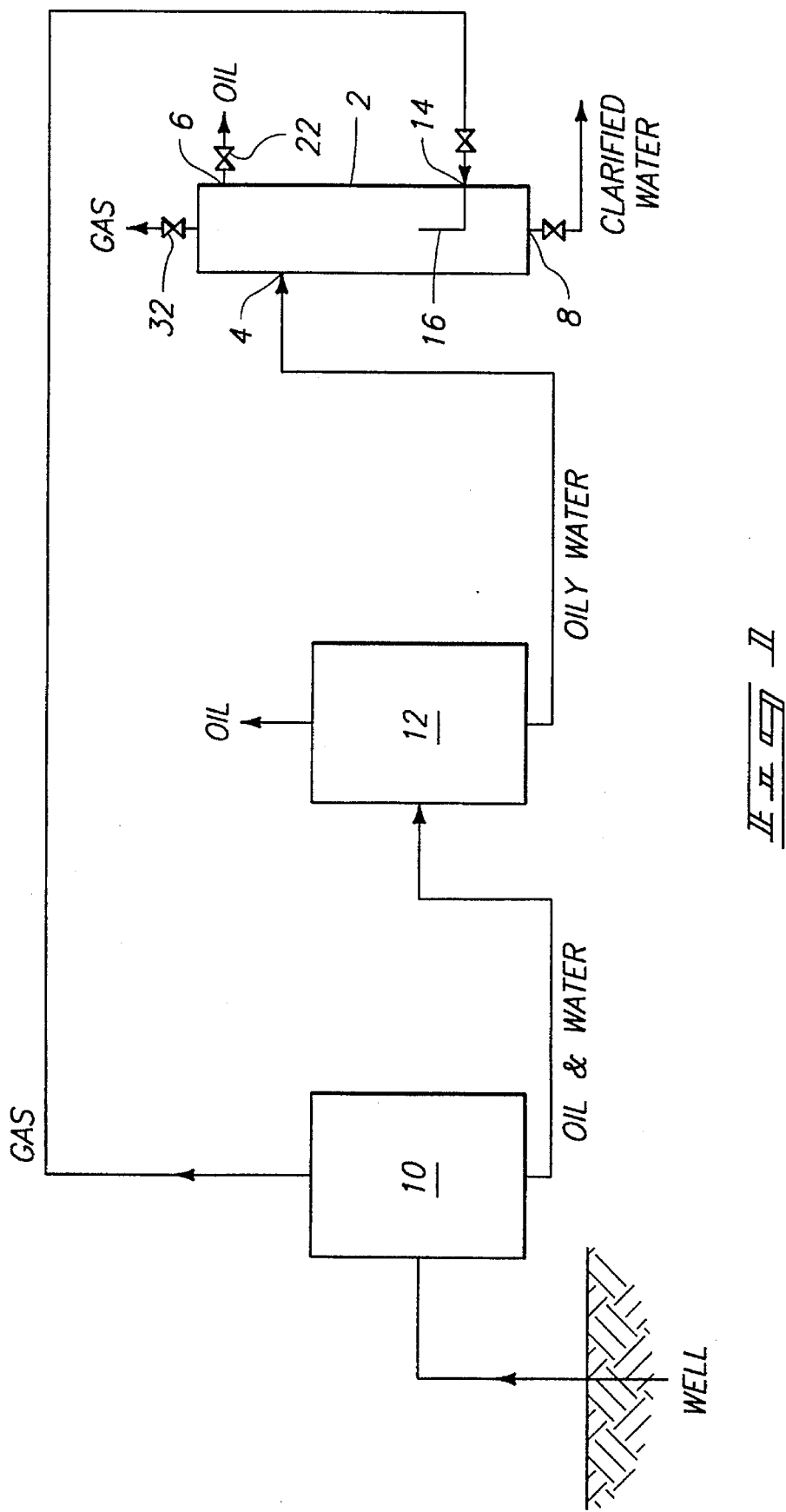
FIG. 1 is a schematic view of one embodiment of a system utilizing the pressurized flotation column of the present invention.

The present invention involves a simple, unique method and apparatus for removing residual oil droplets from oily water. Referring to FIG. 1, one embodiment of the pressurized flotation column comprises vertical column 2 forming a vertically extended zone having oily water inlet 4 positioned in approximately the upper third section of column 2, floated oil outlet 6 and clarified water outlet 8. In one embodiment of the present invention, gas, oil, and water are produced from a well with generally known production techniques. Oil and gas produced from oil fields typically contain substantial amounts of water. To separate the oil, gas and water mixture into its constituent parts, the mixture is introduced into gas separation tank 10 so that the mixture can be separated into its gaseous and liquid constituent parts. The gas is separated for use first in the present method and then subsequently processed or vented.

The liquid constituents are then removed from tank 10 and introduced into a liquid separation tank 12 so that the liquids can be separated into an oil stream and an oily water stream. The liquid separation tank 12 can be a heat treater, consisting of a combination of baffles, weirs, separators, etc. or be any known separating device in the art. A substantial majority of the oil can be removed from liquid separation tank 12 for refining and processing. However, some of the oil is intermixed with the water in the form of residual oil droplets which results in an oily water mixture. These residual oil droplets must be removed before the water can be either used in secondary recovery operations or safely discarded. The small residual droplets of oil suspended in the water can vary from about 5 parts per million to about 2,000 parts per million.

The oil droplets are removed from the oily water in accordance with the present invention by injecting the oily water into pressurized flotation column 2 at oily water inlet 4. Because of the specific gravity of the water in the oily water mixture, the oily water travels downward in the pressurized flotation column. Produced gas recovered during the generally known oil production operation is temporarily diverted from its normal processing route and used in the present invention to remove the residual oil from the oily water produced during the oil production operation. Other hydrocarbonaceous gases or gases that are miscible with oil or that are oleophilic can be used also. Air or other gases can also be used. However, using the field produced gas is advantageous. The field produced gas has a natural affinity (i.e., is oleophilic) for the residual oil droplets and thus readily joins with the oil. In addition, the field produced gas is recovered from the well at very high pressure (e.g., above 1500 psi). As a result, the gas produces a very high pressure in pressurized column 2. However, depending on the requirements and size of the pressurized column used, the pressure of the gas from the well can be reduced some before being introduced into the pressurized column of the present invention. It is also contemplated that the column may be mechanically pressurized if a lower pressure gas source is used. The pressure in the pressurized column is maintained slightly lower than the pressure of the gas routed to the pressurized column so that the gas can rise as bubbles. For example, if the gas pressure is 1500 psi, the column pressure would be about 1300 psi. The pressure in the column preferably is in the range of 20 to 1500 psi.

Figure 3:
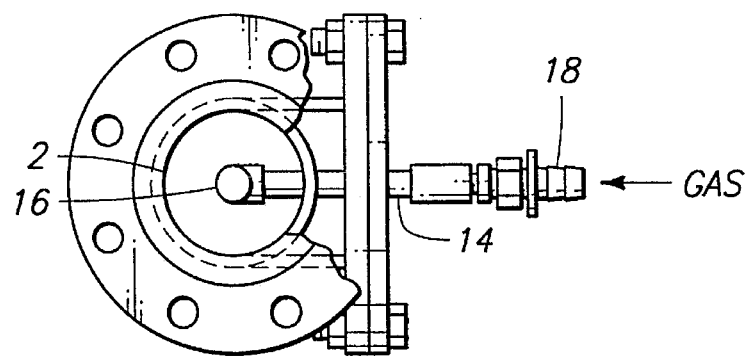
FIG. 3 is a top view of the pressurized flotation column along line 3—3 in FIG. 1 with a portion of the top flange cut-away.
Figure 2:
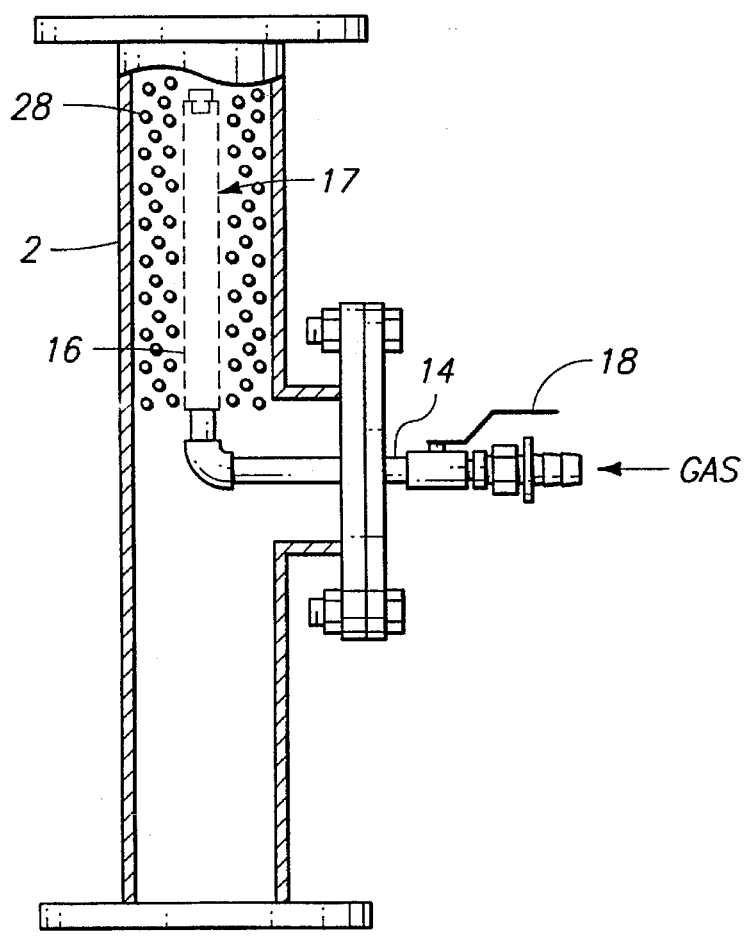
FIG. 2 is an enlarged view of a gas inlet and sparger element in accordance with one embodiment of the present invention.

The field produced gas is routed to pressurized column 2 through gas inlet 14, where the gas passes through a permeable (i.e., porous) medium or sparger element 16 located in the interior of column 2. In one embodiment, as best seen in FIG. 2, the sparger element is preferably a stainless steel tube, centrally positioned in pressurized column 2 with its longitudinal axis parallel to the axis of column 2. Other tubes, for example, sintered poleythylene can be used. Sparger element 16 has a plurality of openings 17, preferably in the range of about 0.5 to 5.0 micrometers and more preferably about 2.0 micrometers to generate gas bubbles 28 having an approximate diameter preferably in the range of about 50 micrometers to about 2000 micrometers and more preferably about 500 micrometers. Sparger element 16 and its position relative to pressurized column 2 is also shown in FIG. 3. Sparger element 16 is located in column 2 so that the gas is injected substantially uniformly across the column's cross-section.

With the column pressurized, the volume and/or size of the produced bubbles can be controlled for more efficient use. For example, with the pressure in column 2 maintained at or above 100 psi, the effect of the hydrostatic pressure caused by the height of the water in the column is minimal. Therefore, the pressure that the bubbles encounter at the bottom of the column is essentially the same as the pressure at the top of the column. As a result, the bubbles do not swell as they rise to the top of the column thus allowing a larger volume of oily water to flow down and out the bottom of the column.

Figure 4:
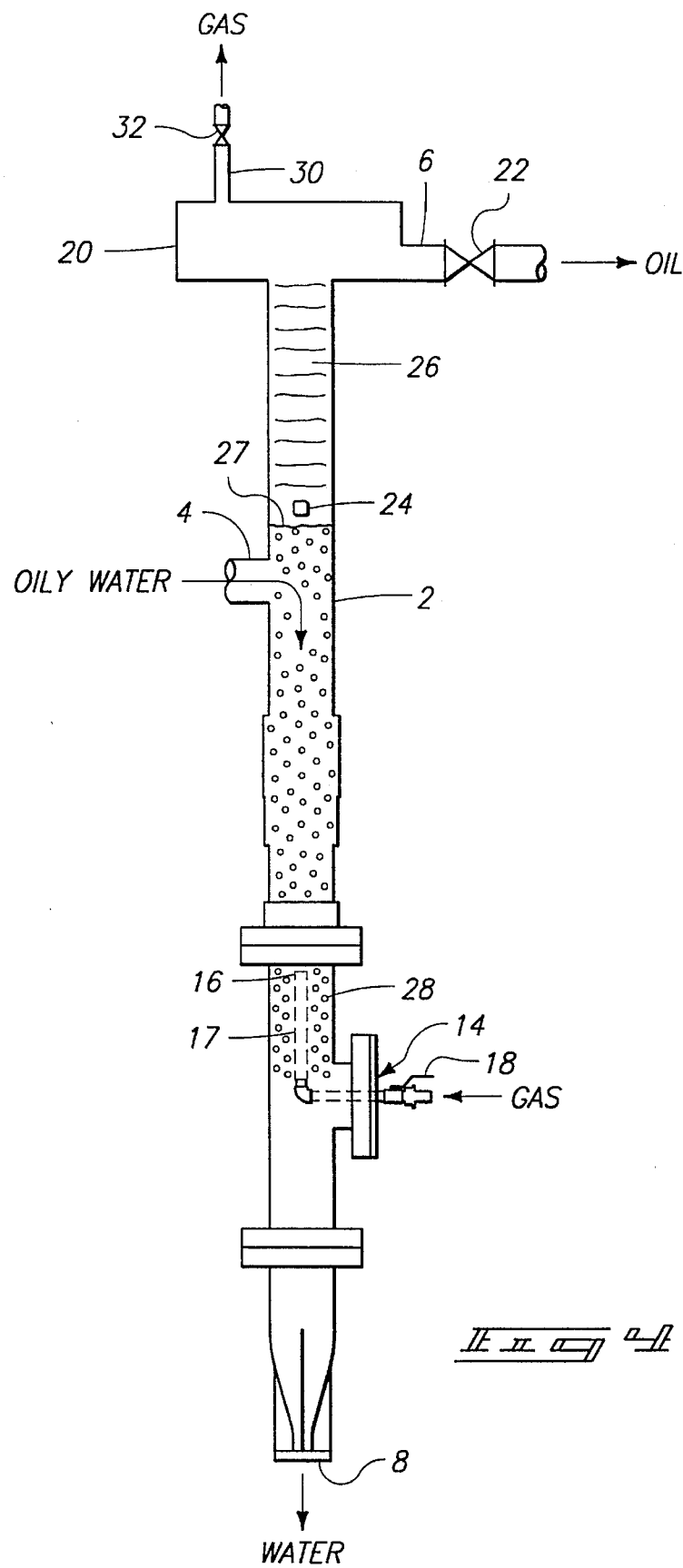
FIG. 4 is a front elevational view of one embodiment of a pressurized flotation column in accordance with the present invention.

The inflow of field available gas into column 2 is regulated by gas inlet valve 18 (FIG. 4) to control the total gas volume generated per unit time within the column. Controlling the total gas volume generated per unit time allows for accurate prediction of the total surface area of the bubbles that will come in contact with the residual oil droplets. Regulating gas inflow through valve 18 is a great improvement over existing flotation technology which can only grossly estimate the total gas surface area, and is further limited by the amount of gas that can be manufactured and dispersed into the oily water. In addition, there are no mixers, pumps or moving equipment.

The gas bubbles produced through sparger element 16 are larger than those created through typical dissolved-gas systems, and therefore have a faster rise rate and greater surface area for oil collection, allowing the present method to be more expedient in clarifying the produced oily water as compared to the dissolved-gas systems. While the sparger produced bubbles of the present invention are generally smaller than those generated in dispersed-gas systems, the neutralizing effect of the high shear pumps used in dispersed-gas systems on the polymers added to facilitate agglomeration of the oil droplets is not present in the present invention, again making the present method more effective.

With the use of pressurization in accordance with the present invention in the flotation column, as mentioned, the produced gas bubbles are smaller than those in a dispersed-gas system, however, they do not increase in size as they rise compared to the bubbles produced in a dispersed-gas system thus not taking up too much space across the cross-section of the column, do not slow the flow of water downward through the column, are not susceptible to popping, rupturing or shearing, and are controllable at a rise rate that allows good interaction of the gas bubbles with the oil droplets with minimal agitation or mixing with the water. In addition, there are no mixers, pumps or moving equipment in the column.

As gas bubbles 28 migrate through the oily water they actively sweep the agglomerated oil droplets to the top of pressurized flotation column 2 where due to the specific gravity of oil as compared to water, the oil droplets can passively collect in overflow compartment 20 for recovery via outflow tube 6. It is believed that as the bubbles rise, the oil droplets initially are bumped by the bubbles and then combine with the bubbles. In contrast, in mineral separation flotation columns, the bubbles continue to bump the minerals toward the top of the column. Thus, another advantage of controlling the size and rise rate of the bubbles with pressure is that the bubbles do not continue to bump the oil droplets away, instead the gas bubbles absorb (i.e., miscibly interact with) the oil droplets or the oil droplets spread out around (or saturate) the rising bubbles to create a thin film on the bubbles. Where again due to the specific gravity of the oil as compared to water, the gas and oil combination increase in buoyancy thus improving flotation without a significant increase in bubble volume.

Pressure control devices 22 and 32 are used to maintain column 2 in a pressurized state by regulating the release of oil and gas. Likewise, the volume of oily water injected into the pressurized column and the volume of water exiting the bottom of the pressurized column are regulated to maintain the column in a pressurized state. With the pressurized column, the volume and/or size of the bubbles produced at the bottom of the column can be maintained at approximately the same size as they rise from the bottom to the top of the column. The bubbles rise to the top of the column essentially in a plug-type flow, that is there is little mixing in the column and the bubbles travel substantially upward only. A fluid level-control system 24 (FIG. 4), of the type well known by one of ordinary skill in production processing, monitors the oily water inflow rate, as well as the resulting separated oil level and outflow rate, to regulate the clarification process of the present method. Maintaining a relatively thick oil pad 26 (i.e., a quiescent volume) at the top of the column has been found to be very advantageous. In operation, it has been found that there are small amounts of water intermixed with the separated oil at the oil-water interface 27. Maintaining oil pad 26 at a sufficient depth ensures that separated oil exits through outflow tube 6 without water.

By using a vertical column, the present invention allows residual oil droplets in the oily water entering through oily water inlet 4 to continuously layer the surface of gas bubbles 28 as they migrate to the top of column 2. The diverted gas, used to produce the sparging effect by flowing the bulk gas across the porous medium or sparger element 16, is then recovered in the top of overflow compartment 20 and routed through gas outlet 30 to be processed or vented as initially planned. The pressure control device 32 allows the gas to be released while maintaining the column in its pressurized state. With this method, the diverted gas is used only once rather than recycled, thereby ensuring that the gas does not reach equilibrium with the water. The hydrogen sulfide created as a result of this single pass process allows for the stripping of volatile hydrocarbons from the water as well as elimination of suspended organics, resulting in substantially complete recovery of water through clarified water outlet 8. The present invention would be particularly useful for an offshore well, in which the hydrostatic pressure would assist with pressurizing a column mounted along side of the legs of the platform. The present invention is not limited to oil field production situations. It can be used in water clarification or other processes.

While the present invention has been described with reference to specific embodiments, this application is intended to cover those various changes and substitutions that may be made by those skilled in the art without departing from the spirit and scope of the appended claims.

What is claimed is:

1. A method for removing residual oil from oily water which comprises:

flowing a liquid stream of an oily water downward through a vertically extended zone to remove the residual oil;

injecting an essentially liquid-free gas into the lower end of said zone and at a rate sufficient to generate bubbles in said liquid stream, said bubbles having a predetermined diameter of between 50 microns and 500 microns;

maintaining a pressure of 100 psi or higher in said zone so as to control the rate of expansion of said bubbles such that the diameter of said bubbles is compatible with oil droplets in said liquid stream during upward migration of said bubbles and said oil droplets;

regulating the rate of flow of said liquid stream from the lower end of said zone and regulating the rate of flow of said gas from the upper end of said zone to collect residual oil from a quiescent volume within the upper portion of said zone; and removing the liquid stream from said lower end of said vertically extended zone.

2. The method of claim 1, further comprising:

regulating the pressure and the amount of the oily water in the vertically extended zone such that the downward flow of the oily water against the upward flow of said bubbles is sufficiently slow that said residual oil droplets coat said bubbles as said bubbles rise.

3. The method of claim 1, further comprising:

regulating the pressure and the amount of the oily water in the vertically extended zone such that the downward flow of the oily water against the upward flow of said bubbles is sufficiently slow that said bubbles and said residual oil droplets miscibly interact.

4. The method of claim 1, wherein:

the interaction of the downward flowing oily water with said rising bubbles occurs in a substantially plug flow environment.

5. The method of claim 1, wherein said gas is any gas miscible with oil.

6. The method of claim 1, wherein said gas is a hydrocarbonaceous gas.

7. The method of claim 1, wherein said gas is natural gas.

8. The method of claim 1, further comprising:

collecting said gas from above said quiescent volume for subsequent general use or processing.

9. The method of claim 1 further comprising:

maintaining said quiescent volume at a thickness sufficient to prevent water from being collected with said residual oil within the upper portion of said zone.

10. The method of claim 1 wherein said gas is injected substantially uniformly across a lower portion of said vertically extended zone such that substantially plug-type flow occurs in said vertically extended zone.

11. In a method for removing residual oil from oily water produced during oil and natural gas production or during water washing of oil products or equipment, of the type wherein a gas is injected as bubbles into the lower portion of a zone and the oily water is injected into the zone above the gas, the improvement comprising:

ensuring that the gas is essentially liquid-free;

pressurizing the zone to a pressure of 100 psi or greater so as to maintain the mean diameter of the bubbles between 50 microns and 500 microns during flow through said zone; and regulating the pressure and the rate of oily water flow through the zone such that the downward flow of said oily water against the rising bubbles does not rupture the bubbles and the pressure in the vertically extended zone is maintained.

12. The improved method of claim 11, further comprising:

regulating the pressure, the injection of the oily water and the release of clarified water such that an environment is created wherein the interaction of the downward flowing water with the rising bubbles is substantially plug-type flow.

13. A method for removing residual oil entrained in water produced during oil production or recovered during water washing of oil products or equipment, said method comprising:

regulating the injection of an essentially liquid-free gas near the bottom of a vertically extended zone to control the total gas volume of bubbles generated in a preselected unit of time;

pressurizing the vertically extended zone to a pressure of 100 psi or greater so as to substantially maintain the mean diameter of the bubbles between 50 microns and 500 microns as they rise to a quiescent zone near the top of the vertically extended zone;

injecting the water sufficiently below the quiescent zone so that the water flows downward against the rising bubbles and residual oil droplets interact with the rising bubbles such that the residual oil is floated to the quiescent zone near the top of the vertically extended zone;

regulating the injection of the water below the quiescent zone and the release of the water near the bottom of the vertically extended zone such that the downward flow of the water against the bubbles is sufficiently slow that said gas and residual oil miscibly interact and the pressure in the vertically extended zone is maintained; and collecting the floated residual oil from the quiescent zone.

14. The method of claim 13, wherein:

the interaction of said downward flowing water with said rising bubbles occurs in a substantially plug flow environment.

15. The method of claim 13, wherein said gas is a hydrocarbonaceous gas.

16. The method of claim 13, wherein said gas is natural gas.

17. The method of claim 13, further comprising:

collecting said gas from above said quiescent zone for subsequent general use or processing.

18. The method of claim 13, further comprising:

maintaining said quiescent zone at a thickness sufficient to prevent water from being collected with said floated residual oil from the quiescent zone.

* * * * *